United States Patent

Grado

[15] 3,694,586

[45] Sept. 26, 1972

[54] TOROIDAL ARMATURE STEREOPHONIC PICKUP

[72] Inventor: Joseph F. Grado, 4614 Seventh Avenue, Brooklyn, N.Y. 11220

[22] Filed: Nov. 3, 1969

[21] Appl. No.: 873,368

[52] U.S. Cl......179/100.41 K, 179/100.41 Z, 274/37

[51] Int. Cl. .............................................H04r 11/12

[58] Field of Search............179/100.41 K, 100.41 M, 100.41 S, 179/100.41 Z

[56] References Cited

UNITED STATES PATENTS

| | | | |
|---|---|---|---|
| 2,829,210 | 4/1958 | Baker | 179/100.41 V |
| 3,067,295 | 12/1962 | Stanton | 179/100.41 K |
| 3,469,040 | 9/1969 | Shaper | 179/100.41 K |

FOREIGN PATENTS OR APPLICATIONS

| | | | |
|---|---|---|---|
| 718,099 | 9/1965 | Canada | 179/100.41 K |

*Primary Examiner*—Bernard Konick
*Assistant Examiner*—Raymond F. Cardillo, Jr.
*Attorney*—Amster & Rothstein

[57] ABSTRACT

A phonograph pickup for the reproduction of stereophonic and/or monaural sound recordings which is of a balanced and magnetic electrical structure and wherein a single elastomeric damping member is employed to achieve a high degree of lateral compliance and torsional damping.

16 Claims, 4 Drawing Figures

INVENTOR
JOSEPH F. GRADO
BY Amster & Rothstein
ATTORNEYS

TOROIDAL ARMATURE STEREOPHONIC PICKUP

The present invention relates generally to phonograph pickups, and in particular to an improved phonograph pickup or electromagnetic cartridge for the reproduction of stereophonic and/or monaural sound recordings.

In a typical cartridge, there is provided a support usually in the form of a cartridge housing on which is mounted a stylus-armature assembly which includes a cantilever-supported stylus lever having the requisite compliance such that the stylus thereof may track the usual 45°–45° groove of a stereophonic record disc. An appropriate magnetic structure is provided including first and second pairs of coils, with each pair being connected in series. The pairs of coils have signals induced therein which are related to the two modulations derived by the stylus from the stereophonic record groove. Signals or voltages are induced in the coils through the provision of a moving iron mass or armature which is disposed within magnetic gaps defined by the permanent magnet and pole pieces of the magnetic structure.

There are numerous design problems presented in the commercialization of pickups or cartridges of this type and in continually improving their performance to assure higher and higher fidelity in record reproduction. Among the areas requiring improvement are isolating of the magnetic structure of the pickup from stray fields to reduce spurious signal generation and hum, obtaining relatively low generator or armature mass to reduce the level of distortion over the range of audible frequencies, and providing the prerequisite torsional damping and preloading of the stylus lever without adversely affecting its compliance.

For example, in a typical cartridge, provision is usually made, as by a magnetic shield, to isolate the magnetic structure of the cartridge from stray fields. The failure to appropriately isolate the signal-generating structure produces undesirable voltages which manifest themselves as spurious signal generation and audible hum. Although many cartridges effectively employ magnetic shielding, this solution to stray field reduction is relatively expensive, restricts the cartridge design, contributes to increased cartridge weight and often results in lack of accessibility to the cartridge for replacement and repair of components including the stylus thereof. Further, and perhaps most important, such magnetic shield itself represents another potential source of magnetic distortion. The problems of shielding become even more pronounced in a stereophonic cartridge which includes two coil structures oriented at right angles to each other and at 45° to the horizontal. Accordingly, as a first feature of the invention, there is provided a balanced magnetic and electrical structure which is set up such that any voltages produced in the cartridge as a result of stray magnetic fields are effectively cancelled out in the balanced magnetic and electrical structure.

In accordance with an illustrative embodiment demonstrating objects and features of this aspect of the invention there is provided an electromagnetic cartridge having a moving stylus, a magnetic structure including first and second pole pieces terminating in faces said faces and an opposing magnetic plate defining first and second operating gaps and an armature disposed in first and second operating gaps and movable in response to motion of the stylus. The armature and the first and second pole piece faces define first and second working gaps. First and second coils are mounted on the first and second pole pieces and connected in series. The first and second coils are of substantially identical configuration and are connected in voltage adding and hum cancelling relation to each other. Means are provided in the magnetic structure to form first and second compensating gaps for the first and second operating gaps, and the first and second working gaps. The first and second compensating gaps are sized in relation to their corresponding operating and working gaps and the pole pieces are disposed in relation to the coils such that the magnetic structure is substantially balanced and symmetrical with the coils whereby stray fields will not produce hum-producing voltages in the cartridge. This balanced magnetic structure is useful both in the manufacture of monaural and stereophonic cartridges; and in both constructions, the stray magnetic fields to which the cartridge is exposed are effectively cancelled within the signal-generating structure by balancing the magnetic circuit, the electrical hum-bucking characteristics of the coil windings and the effectively balancing the coil position relative to the magnetic circuit. Thus, there is substantially no production of spurious noise due to magnetic imbalance.

As a further feature of the invention, the armature of the cartridge is of a configuration and orientation in relation to the operating gap to provide a reduced torsional mass in the given gap region for a particular design. In accordance with this aspect of the invention, the armature is toroidal and is of substantial triangular cross-section with one side or leg of the triangle providing an armature face substantially parallel to the pole piece faces. The armature is arranged to provide a progressively decreasing cross-section and corresponding mass at increased radii from the center thereof. With the conical configuration, less armature mass is provided at progressively increasing radial distances from the center of the armature which mass reduction is achieved without reducing the effective dimension of the armature face. This affords an armature structure which has a high efficiency and comparatively low mass. Mass reduction produces less undesirable resonances and/or distortions in the reproducing system within the audible frequency range and with appropriate generating mass reductions, it is possible to assure that any resonant distortion will occur beyond the audible frequency range. In a typical cartridge, the generator resonates in the 4–10 kHz range, with a maximum frequency range to 15–18 kHz. In a typical cartridge in accordance with the present invention, armature resonance occurs in the range of 26 kHz, with a maximum range to 50 kHz, well out of the audible range as compared to typical prior art structures.

Still further, in the design of a cartridge, it is important that the stylus lever have a high degree of lateral compliance such that it will accurately track the groove modulation at relatively low tracking forces. However, it is also important that the stylus lever be appropriately torsionally damped such that it does not turn on its longitudinal axis. It is usually quite difficult, if not impossible to achieve the desired parameters for compliance and torsional damping with a single elastomeric damping member and by a relatively simple construction suitable for mass production manufacture at relatively low unit cost.

In accordance with this aspect of the invention, there is provided a stylus lever-armature assembly having an armature, a curved armature support (i.e., cone-shaped), a stylus lever projecting from the armature for imparting signal-generating motion thereto and a laterally compliant, torsionally dampened and preloaded mount for the stylus lever-armature assembly. The mount includes an elastomeric damping member which is mounted on the support of the cartridge and has an inwardly directed seat shaped to be complementary to the armature support. Pivot means are provided for the stylus lever within the damping member to mount the armature support in bearing relation to the damping member. Preferably, the armature support and its curved seat are both of a conical cross-section. In accordance with this aspect of the invention, it is possible to control the preloading of the pivot of the stylus lever, achieve the desired lateral compliance and appropriately torsionally damp the stylus-armature assembly independently of each other, yet with a single elastomeric means. Specifically, the stylus lever pivot may be selectively preloaded as a function of the elastomeric material used in the damping member, the angle of the complementary conical armature and seat and the initial axial pressure established between the armature support and the seat. Lateral compliance may be controlled by establishing the requisite steepness for the angle of the complementary armature support and seat which determines the amount of elastomeric material present at progressively increasing radii of the conical armature support. As the cone angle increases, relatively less elastomeric force is presented to the lateral compliance of the stylus lever. Torsional damping in turn is controlled as a function of the angle of the cone, with increased torsional damping forces established at steeper angles, and/or larger diameters. By appropriately establishing the interrelationship between these several forces and optimization of the design, it is possible to achieve a high degree of lateral compliance and the requisite torsional damping force utilizing a single elastomeric damping member bearing against its coacting armature support.

Still other objects, features and advantages of the present invention will be understood by reference to the following detailed description of a presently preferred, but nonetheless illustrative embodiment of the present invention, when taken in conjunction with the accompanying drawings, wherein.

Figures 1, 2, 3, 4:
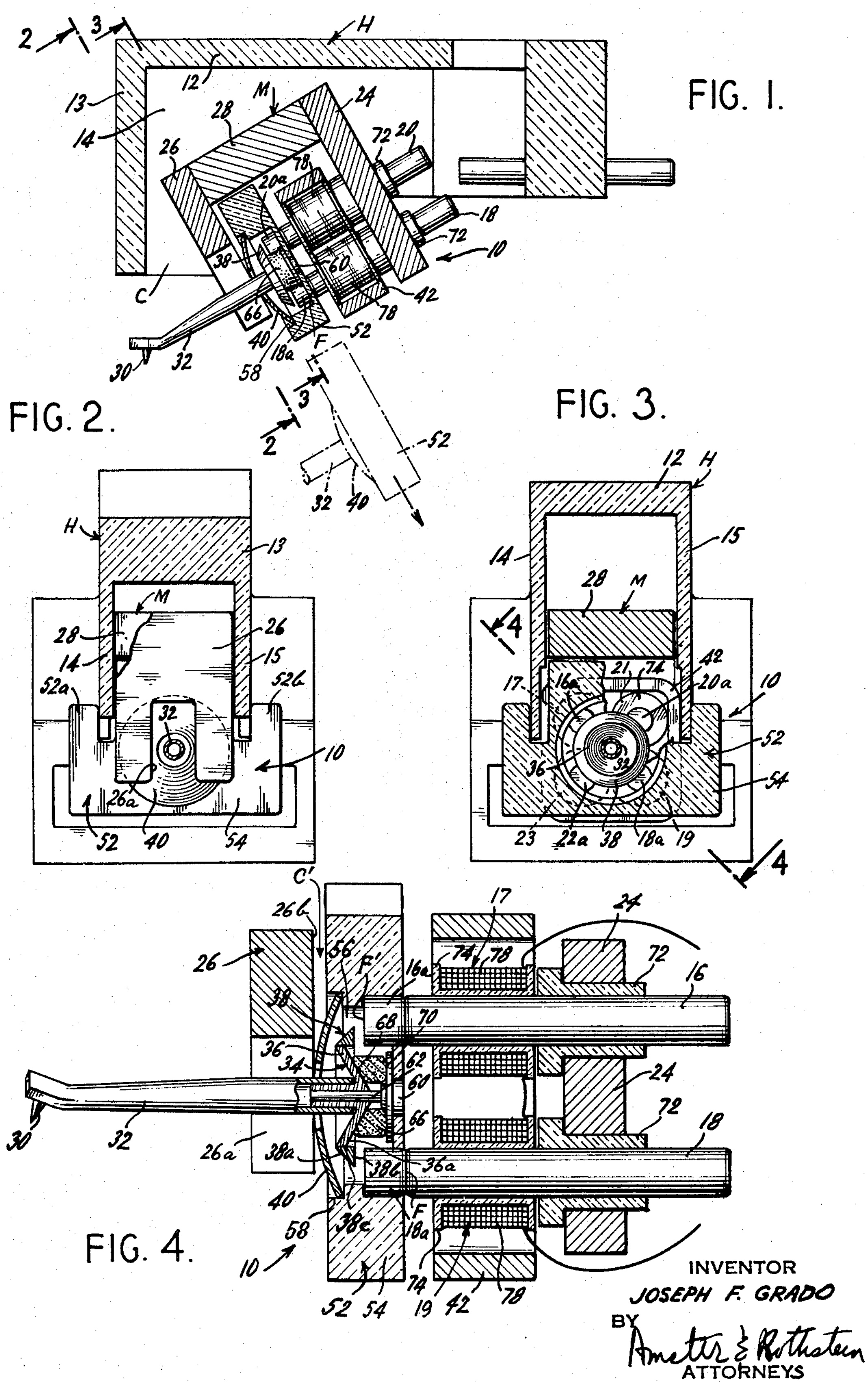
FIG. 1 is a longitudinal sectional view of a typical stereophonic cartridge or pickup embodying features of the present invention, shown with the balanced magnetic structure partially removed from the cartridge housing, the dotted lines showing a removed position for the stylus lever-armature assembly.
FIG. 2 is a sectional view, taken substantially along the line 2—2 of FIG. 1 and looking in the direction of the arrows.
FIG. 3 is a sectional view taken substantially along the line 3—3 of FIG. 1 and looking in the direction of the arrows.
FIG. 4 is a sectional view, on an enlarged scale, taken substantially at 45° to the horizontal and along the lines 4—4 of FIG. 3 and looking in the direction of the arrows.

Referring now specifically to the drawings, and in particular to FIG. 1, there is shown an improved electromagnetic cartridge or pickup for stereophonic reproduction, generally designated by the reference numeral 10, which is removably mounted within an appropriate housing H which is in turn removably mounted on the tone arm for the turntable or record player. Housing H includes top wall 12, front wall 13, and spaced side walls 14, 15 which define a downwardly opening cartridge-receiving chamber C into which the cartridge 10 is inserted, provision being made as is generally understood for establishing the appropriate electrical connections to the cartridge when inserted within housing H.

Cartridge 10 includes a balanced magnetic structure M which includes four pole pieces 16, 18, 20, and 22. Pole pieces 16, 18 provide a first diametrically opposed pair having their longitudinal center lines in a substantially common plane at 45° to the horizontal (see 45° section of FIG. 4); and pole pieces 20, 22 provide a second diametrically opposed pair in which the pole pieces have their longitudinal center lines in a substantially common second plane at 45° to the horizontal and at right angles to the first plane. A first pair of coils 17, 19 is mounted on the first pair of pole pieces 16, 18 and connected in voltage adding and hum cancelling relation to each other; and a similar second pair of coils 21, 23 are mounted on the second pair of pole pieces 20, 22, with the coils likewise being connected in voltage adding and hum cancelling relation to each other. Typically, each of the coils 17, 19, 21 and 23 includes a coil bobbin, generally designated at 74, and fabricated of a non-ferrous material and a coil proper, generally designated at 78, and wound such that the opposed pairs of coils 17, 19, and 21, 23 are of substantially identical configuration to avoid introducing any electrical imbalance in the coil arrangements and symmetry.

The plural pole pieces are part of the balanced magnetic structure M which also includes a rear magnetic plate 24 serving as a pole piece support (as will be described), a front magnetic plate 26 disposed in spaced parallel relation to the rear plate 24 and a permanent magnet 28 interconnected therebetween. Front magnetic plate 26 serves to define an accurate operating gap between the front magnetic plate 26 and the faces F' of pole piece extensions 16*a*, 18*a*, 20*a* and 22*a*. The pole piece extensions are magnetically and physically connected to respective pole pieces 16, 18, 20 and 22; which pole pieces, through compensating gaps (to be discussed later), are magnetically connected to rear magnetic plate 24. The rear magnetic plate is connected to front plate 26 via magnet 28. Thus, a magnetic circuit is completed between opposed polarities of front magnetic plate 26 and faces F' of pole piece extensions 16*a*, 18*a*, 20*a* and 22*a*.

Disposed in the magnetic path afforded by the magnetic structure M is a stylus lever-armature assembly, generally designated by the reference numeral 52 which is removably mounted in a downwardly opening socket or cavity C' provided intermediate the rear face of the front magnetic plate 26 and the adjacent front faces F of the pole pieces 16, 18 and 20, 22, which pole piece faces F terminate or lie in a common plate (see FIGS. 1 and 4). Assembly 52 includes a carrier 54, as of a molded plastic, formed with a central cavity 56 having a shoulder or seat 58 opening toward the front magnetic plate 26 of the magnetic structure M. Mounted on the non-ferrous carrier 54 axially of the cavity 56 is the stylus lever-armature assembly 52 which includes the usual stylus 30 mounted at the end of a stylus lever 32 which carries an armature subassembly 34 including a non-magnetic armature support 36 and a toroidal armature 38. Stylus lever 32 may be fabricated of aluminum or the like, and carries a reduced diameter flexible pivot shaft 62 extending axially thereof and anchored on base member 60 which is secured to carrier 54. Flexible pivot shaft 62 provides a well defined pivot for the stylus lever 32 in the region surrounded by the substantially cylindrical elastomeric damping member 66. The stylus lever-armature assembly 52 is completed by the provision of four pole piece extensions 16*a*, 18*a*, 20*a* and 22*a* which, in the operative position of assembly 52 (see FIGS. 1 and 4) effectively provide integral extensions of their respective pole pieces.

The removable mounting of the assembly 52 is accomplished by appropriately sizing the carrier 52 in relation to the socket or cavity C' and, if necessary, molding body 54 with surfaces which will interengage with the housing H, as for example the guiding extension 52*a*, 52*b* which engage the lower part of side walls 14, 15. The front magnetic plate 26 is provided with an appropriate cutout at 26*a* to afford the necessary clearance for stylus lever 32. Surrounding stylus lever 32 is a resilient mounting washer or member 40 which is sized to be appropriately seated against the annular shoulder afforded by seat 58 and to bear against the inner side wall of front magnetic plate 26 to assist in retaining the stylus lever-armature assembly 52 in its assembled position wherein pole piece extension 16*a*, 18*a*, 20*a* and 22*a* bear against their respective pole pieces 16, 18, 20 and 22. For all intents and purposes, the pole piece extensions may be considered to be integral with their respective pole pieces and the forward faces F' of extensions 16*a*, 18*a*, 20*a* and 22*a*, cooperate with the rearmost face 26*b* of the front magnetic plate 26 to define an operating gap of substantially uniform width in which gap armature 38 is effective to induce voltages in the first and second coil pairs 17, 19 and 21, 23 in accordance with stylus excursions incident to tracking of the record, as is generally understood. Armature 38 is of substantially triangular cross-section and includes a base leg 38*a* 38*c* which is the generatrix of a cylindrical surface about the axis of the stylus lever 32 and is supported by the conical non-ferrous armature support 34. The radial or altitude leg 38*b* of armature 38 provides an annular face common to the four pole piece faces and spaced therefrom to define the working gaps for the stereophonic cartridge. The right triangular cross-section of the armature 38 is completed by the hypothenuse leg 38*a*, with the cross-section being such to provide a progressively decreasing mass at increasing radii from the center of the toroidal armature. It will be appreciated that the triangular cross-section of the armature and its orientation to the working gap provides a working gap of uniform width which varies as a function of armature motion incident to stylus tracking of the record groove. At progressively increasing radial distances from the center of the armature 38, there is less mass without reducing the effective area of the armature face 38*b* of the working gap. This produces an armature structure which has high efficiency and a relatively low mass, particularly as compared to a toroidal armature of substantially uniform cross-section which although having the same effective armature face area would have increasing effective mass at progressive radial distances from the center of the generating unit. The structure of the present invention is highly efficient in inducing signals in the respective coil pairs, it does so with a relative low moving mass. Accordingly, it is possible to design the pickup such that resonant distortion will occur beyond the audible frequency range, for example at 26,000 cycles which is beyond the audible range for all practical intents and purposes.

The rearwardly directed conical face 36*a* of the non-magnetic armature support 36 bears against an inwardly directed complementary conical seat 68 formed on the forward end of damping member 66. Damping member 66 has its opposite end face 70 secured under pressure against base member 60 serving as a backup or compression plate. By appropriate selection of materials and design, it is possible to accomplish a number of related functions with the single elastomeric damping means 66 including the establishment of a desired preloading for the pivot, controlled lateral compliance and appropriate independent torsional damping. The objectives realized by this arrangement include the preloading of the pivot for the stylus lever 32 which pivot, for all practical intents and purposes, may be considered to be a simple pivot someplace along the length of pivot shaft 62 (i.e., rearwardly of the apex of conical support 36 and forwardly of the longitudinal extent of base member 60). Loading of the pivot of course is determined by the original assembly of the armature support 36 in relation to the elastomeric damping member 66 and its axial compression incident to its sandwiching between armature support 36 serving as one bearing plate and base member 60 serving as an opposing bearing plate. The lateral compliance of the stylus lever is controlled by varying the steepness of the angle of the complementary conical bearing surfaces 36*a*, 68 and the amount of the elastomeric damping material present at increasing radii of the conical support. The steeper the conical angle, the less elastomeric material and force presented to the lateral compliance of the stylus lever. Finally, the torsional damping is controlled as a function of the angle of the cone, with increased torsional damping forces being presented at steeper angles and with corresponding increases in the surface contact area between the conical armature and the complementary conical armature support.

As previously explained, the respective pairs of pole pieces 16, 18 and 20, 22 are mounted on the rear magnetic plate 24. Mounting is by respective non-ferrous mounting and spacer sleeves 72 which provide respective first and second pairs of compensating gaps for the first and second pairs of pole pieces 16, 18 and 20, 22. The compensating gaps are sized in relation to the corresponding operating gaps defined between front magnetic plate 26 and the front faces F' of the respective pole piece extensions, and working gaps, defined between armature 38 and the front faces F' of the respective pole piece extensions to provide a balanced magnetic structure having coil symmetry and position such that stray fields will not generate hum-producing voltages in the cartridge. Whether the cartridge be of the stereophonic or monaural type, the respective coils are disposed substantially magnetically symmetrical of the pole pieces and magnetic structure including their respective extensions; and the operating and working gap for each pole piece is balanced by its corresponding compensating gap by adjusting the effective pole piece length to achieve a tuned hum null. Typically, this is accomplished by exposing a test cartridge to a stray field and for a given operating gap observing the effect of lengthening and shortening the pole pieces and changing the width of the corresponding compensating gaps. The cartridge is nulled by optimizing pole piece length and compensating gap width and repeating these procedures until a minimum hum is produced by the cartridge. Usually one sequence of adjustments is all that is necessary to optimize the design of a monaural type cartridge, but with a stereo type cartridge, there is some interaction between channels and accordingly, successive adjustments may be required in the two channels. Optionally, and additionally, a cylindrically ferrous ring 42 may be provided surrounding the coils 17, 19, 21, 23 to assist in establishing a hum-nulling design.

By way of example, a typical balancing operation will be described. The first compensating gap pair is provided to balance the first working gap pair and the first operating gap pair. The second compensating gap pair is provided to balance the second working gap pair and second operating gap pair. In other words, the first comepnsating gap pair is provided to balance a first "effective" gap pair which is formed by the first working gap pair and the first operating gap pair. Similarly, the second compensating gap pair is provided to balance a second "effective" gap pair formed by the second working gap pair and the second operating gap pair. This is required since if the system is not magnetically balanced, the system is susceptible to hum which is picked up by coils 17, 19, 21 and 23.

In practice, in order to provide a magnetically balanced system which is not susceptible to hum pickup, the pole piece pairs 16, 18 and 20, 22, are lengthened at the end opposite faces F' (are lengthened at the ends extending outwardly from sleeves 72 at the right hand portion thereof). The pole pieces are lengthened until the hum is nulled. The hum is nulled by effectively balancing the coil position relative to the magnetic circuit. Then the compensating gap pairs, provided by sleeves 72, are adjusted by sizing the cross-sectional width of the sleeves thereby varying the gap-distance between the pole pieces and rear magnetic plate 25. This results in a further reduction of the hum. The pole pieces are then again adjusted in length until the hum is nulled and the compensating gaps are further adjusted. This procedure is repeated until the desired hum reduction is achieved. It should be noted, that this procedure is required in the design state only and, once the length of the pole pieces and the compensating gap distances have been determined, a plurality of electromagnetic cartridges may be fabricated having the desired hum reduction.

What I claim is:

1. In an electromagnetic cartridge having a moving stylus, a magnetic structure having a front magnetic member and including first and second pole pieces terminating in faces, said front magnetic member and said first and second pole piece faces defining first and second operating gaps, an armature disposed in said first and second operating gaps and means mounting said armature for movement in a direction substantially parallel to said first and second operating gaps in response to motion of said stylus, said armature and said pole piece faces defining first and second working gaps, first and second working gaps, first and second coils mounted on said first and second pole pieces, said first and second coils being of substantially identical configuration and connected in voltage adding and hum cancelling relation to each other, means in said magnetic structure providing first and second compensating gaps for said first working and first operating gaps and said second working and second operating gaps, respectively, said first and second compensating gaps being sized in relation to the corresponding operating and working gaps and said pole pieces being disposed in relation to said coils such that said mangnetic structure is substantially balanced and symmetrical with respect to said coils whereby stray fields will not produce hum-producing voltages in said cartridge.

2. An electromagnetic cartridge according to claim 1 including a rear magnetic member and respective non-magnetic spacers mounting said pole pieces on said rear magnetic member, said spacers being dimensioned to provide said first and second compensating gaps between said pole pieces and said rear magnetic member.

3. An electromagnetic cartridge according to claim 1, wherein said armature and stylus are removably mounted on said magnetic structure.

4. An electromagnetic cartridge according to claim 3 wherein said armature and stylus are removably mounted on a common non-magnetic carrier, said first and second pole pieces including first and second pole piece extensions mounted on said carrier and removably mounted thereon, said first and second pole piece extensions bearing against said first and second pole pieces respectively when said carrier is mounted on said magnetic structure and having free end faces providing said faces defining said first and second operating gaps and said first and second working gaps.

5. In a stereophonic electromagnetic cartridge having a moving stylus, a magnetic structure having a front magnetic member and including first and second pairs of pole pieces terminating in faces, said front magnetic member and said pole piece faces defining first and second pairs of operating gaps, an armature disposed in said first and second pairs of operating gaps and means mounting said armature for movement in a direction substantially parallel to said first and second operating gaps in response to motion of said stylus, said armature and said first and second pairs of pole piece faces defining first and second pairs of working gaps, first and second pairs of coils mounted on said first and second pairs of pole pieces and connected by pairs said first and second pairs of coils being of substantially identical configuration and connected respectively in voltage adding and hum cancelling relation to each other, means in said magnetic structure providing first and second pairs compensating gaps for said first pair of working gaps and first pair of operating gaps and second pair of working gaps and second pair of operating gaps, respectively, said first and second pairs of compensating gaps being sized in relation to the corresponding operating and fixed working gap pairs and said pole pieces being disposed in relation to said coils such that said magnetic structure is substantially balanced and symmetrical with respect to said coils whereby stray fields will not produce hum-producing voltages in said cartridge.

6. An electromagnetic cartridge according to claim 5 including a rear magnetic member and first and second pairs of non-magnetic spacers mounting said first and second pairs of pole pieces on said rear magnetic member, said spacers being dimensioned to provide said first and second pairs of compensating gaps between said pole pieces and said rear magnetic member.

7. An electromagnetic cartridge according to claim 6, wherein said armature and stylus are removably mounted on said magnetic structure.

8. An electromagnetic cartridge according to claim 7 wherein said armature and stylus are removably mounted on a common non-magnetic carrier, said first and second pairs of pole pieces including first and second pairs of pole piece extensions mounted on said carrier and removably mounted thereon, said first and second pairs of pole piece extensions bearing against said first and second pole pieces respectively when said carrier is mounted on said magnetic structure.

9. In an electromagnetic cartridge, a magnetic structure having a front magnetic member and including first and second diametrically opposed pairs of pole pieces having pole piece faces, said pole piece faces and said front magnetic member defining first and second pairs of operating gaps, said first pair of pole pieces having their longitudinal center lines in a substantially common first plane at 45° to the horizontal and said second pair of pole pieces having their longitudinal center lines in a substantially common second plane at right angles to said first plane and a toroidal armature in said first and second pairs of operating gaps, means mounting said armature for movement in a direction substantially parallel to said first and second operating gaps, said toroidal armature being of substantially triangular cross-section with one side thereof providing an armature face substantially parallel to said pole piece faces, said armature being arranged to provide a progressively decreasing cross-section and corresponding mass at increasing radii from the center thereof.

10. An electromagnetic cartridge according to claim 9 including a non-magnetic support for said armature.

11. An electromagnetic cartridge according to claim 10 wherein said support is conical.

12. An electromagnetic cartridge according to claim 11 wherein the cross-section of said armature is a right triangle with the base leg thereof being mounted on said conical support.

13. An electromagnetic cartridge comprising a support, a stylus-armature assembly mounted on said support and including a stylus lever pivotally mounted on said support and being uniformly compliant in all directions and a toroidal armature mounted on said stylus lever, a magnetic structure including a permanent magnet, a front magnetic member defining one side of first and second pairs of operating gaps and first and second diametrically opposed pairs of pole pieces having pole piece faces disposed in a substantially common plane and defining another side of said first and second pairs of operating gaps, said first pair of pole pieces having their longitudinal center lines coplanar at 45° to the horizontal and said second pair of pole pieces having their longitudinal center lines coplanar and at right angles to said first pair, said toroidal armature being disposed in said first and second pairs of operating gaps and being of a cross-section such that one side thereof provides a single armature face substantially parallel to said pole piece faces, means mounting said toroidal armature for movement in a direction substantially parallel to said first and second operating gap pairs, said toroidal armature being arranged to provide a progressively decreasing cross-section and corresponding mass at increasing radii from the center thereof.

14. An electromagnetic cartridge according to claim 13 including a non-magnetic armature support for said toroidal armature.

15. An electromagnetic cartridge according to claim 14 wherein said armature support is conical.

16. An electromagnetic cartridge according to claim 15 wherein the cross-section of said armature is a right triangle with the base leg thereof being mounted on said conical support.

* * * * *